(12) United States Patent
Wessling

(10) Patent No.: US 8,359,315 B2
(45) Date of Patent: Jan. 22, 2013

(54) GENERATING A REPRESENTATIVE SUB-SIGNATURE OF A CLUSTER OF SIGNATURES BY USING WEIGHTED SAMPLING

(75) Inventor: Jens Nicholas Wessling, Ann Arbor, MI (US)

(73) Assignee: Rovi Technologies Corporation, Santa Clara, CA (US)

( * ) Notice: Subject to any disclaimer, the term of this patent is extended or adjusted under 35 U.S.C. 154(b) by 309 days.

(21) Appl. No.: 12/456,194

(22) Filed: Jun. 11, 2009

(65) Prior Publication Data

US 2010/0318493 A1    Dec. 16, 2010

(51) Int. Cl.
*G06F 17/30* (2006.01)
(52) U.S. Cl. ..................................... 707/737
(58) Field of Classification Search .............. 707/736; 709/224
See application file for complete search history.

(56) References Cited

U.S. PATENT DOCUMENTS

| | | | |
|---|---|---|---|
| 7,136,866 B2 * | 11/2006 | Springer et al. .............. | 1/1 |
| 7,277,766 B1 | 10/2007 | Khan et al. | |
| 7,451,078 B2 | 11/2008 | Bogdanov | |
| 7,567,899 B2 | 7/2009 | Bogdanov | |
| 2006/0149533 A1 | 7/2006 | Bogdanov | |
| 2006/0149552 A1 | 7/2006 | Bogdanov | |
| 2007/0106405 A1 | 5/2007 | Cook et al. | |
| 2010/0124335 A1 | 5/2010 | Wessling et al. | |
| 2010/0128936 A1 * | 5/2010 | Baughman ............... | 382/116 |
| 2010/0153393 A1 | 6/2010 | Wessling et al. | |
| 2010/0228704 A1 | 9/2010 | Kahlbaum et al. | |
| 2010/0228736 A1 | 9/2010 | Kahlbaum et al. | |
| 2010/0318586 A1 | 12/2010 | Wessling | |

OTHER PUBLICATIONS

Lagus et al.,"Keyword selection method for characterizing text document maps",1999, Artificial Neural Networks, Sep. 7-10, 1999, Conference Publication No. 470 © IEE 1999, pp. 371-376.*
Cazzanti, et al., "Automatic Identification of Sound Recordings", Signal Processing Magazine, IEEE, 2004.
PCT International Search Report, dated Aug. 24, 2010 in corresponding International Application No. PCT/US2010/036092.
Written Opinion of the International Searching Authority, dated Aug. 24, 2010 in corresponding International Application No. PCT/US2010/036092.
International Preliminary Report on Patentability, dated Dec. 12, 2011 in corresponding PCT Application No. PCT/US2010/036092.

* cited by examiner

*Primary Examiner* — Rehana Perveen
*Assistant Examiner* — Alexander Khong
(74) *Attorney, Agent, or Firm* — Schwegman Lundberg & Woessner, P.A.

(57) ABSTRACT

A method and a system are provided for generating a representative sub-signature of a particular cluster of signatures. In one example, the system reads a sub-signature of a signature of the particular cluster. The system calculates a first factor for the sub-signature. The first factor is based on how many signatures contain the sub-signature. The signatures are in the particular cluster. The system calculates a second factor for the sub-signature. The second factor is based on how many signatures in other clusters contain the sub-signature. These other signatures in other clusters are not in the particular cluster. The system calculates an effectiveness score for the sub-signature. The effectiveness score is based on at least the first factor and the second factor. The system then determines one or more representative sub-signatures for the particular cluster. The one or more sub-signatures are based on one or more effectiveness scores calculated by the system.

29 Claims, 6 Drawing Sheets

Cluster 305

Representative Sub-Signatures = abc, xyz — 310

| Signature 1 | Signature 2 | ... | Signature W |
|---|---|---|---|
| h h h c c h | c c c c r r r | | g g h h h c |
| r r l l l x x t t | r l l m m t t | | h h r r [abc] |
| t v v j j c c | v b c c s s | | l l l x x t t t |
| s s s [xyz] | s s w w r r | | v v c c c s |
| h p p p r r v | o p p p r r v | | s s s h h h |
| v t t x x i i i | t t i i i c c j | | p p p r m v |
| j x x c w l l l | x x g g l l l l | | v t t t x x i i |
| h h l l [abc] | a p p f e e | | x x x g l l l |
| f e e m i n t | m m [abc] t | | [xyz] f e e |
| t t x c c v v | t n c h h r r | | m m n n t t |
| v j j r r s s f | r r s s f f f h | | b c c v v j j |
| f f h h a a a | h a a a n n | | j c c s s f f f |
| n n i i i g g | i i t x x g u | | h h a a a n |
| c u c j j j v | u [xyz] j j | | n i i i g c c |
| v v l l e a a | v v b b l l e | | v v j j j v v |
| a f f f h h h | a a a f f f h | | v l l l e a a |
| l l e e w w | h l | | a f f f h h |
| c c v v v j j | | | |
| j u c c e n | | | |
| n n b b b x | | | |
| u u u u w | | | |
| w w e m m | | | |

FIG. 3

GENERATING A REPRESENTATIVE SUB-SIGNATURE OF A CLUSTER OF SIGNATURES BY USING WEIGHTED SAMPLING

FIELD OF THE INVENTION

The invention relates to facilitating data searches. More particularly, the invention relates to arranging data into clusters and generating representative sub-signatures of the clusters to facilitate data searches.

BACKGROUND

Searching data on a server is an operation that a client computer may initiate over a network, such as the Internet. Data is organized in some manner in the server to which the client computer sends a query. The advent of digital media (e.g., audio and/or video) has caused the sheer size of data to become enormous. When a client computer queries a server, the server may have to search through an enormous amount of data to provide a result for the query. Conventional methods of retrieving data are decreasing in efficiency because methods of searching data sets are not evolving as quickly as the data sets are getting bigger.

SUMMARY

A system may include a database storing clusters of signatures. A cluster is a set of alternative, yet similar, signatures of the same item. One example of a signature is an audio fingerprint. For example, a CD may have multiple similar fingerprints due to imperfections in pressings or readings, among other reasons. The set of similar signatures for the CD is referred to as a cluster.

A signature is typically associated with information in a database. For example, a fingerprint may be associated with metadata in a database. Metadata for a CD may include, for example, song name, artist information, album information and/or other types of supplemental information.

A system may use a signature to identify data during a search (e.g., fuzzy search). For example, a user may input a CD into a CD player of a user computer. The user computer may compute the CD's signature (e.g., audio fingerprint) upon detection of the disc in the CD player. The user computer may send the signature to a remote server to search for a matching record in a database that contains metadata about various CDs. The remote server may have signatures arranged in clusters. Each cluster of signatures may be associated with metadata for a particular CD. Upon finding a match for the queried signature, the remote server may send the metadata to the user computer. The user computer may then display the metadata.

For searching purposes, it is advantageous for each cluster in a database to have one or more representative sub-signatures. The system preferably determines these representative sub-signatures before the system performs any searches in the clusters. In some embodiments, the system may subsequently perform a search by searching the representative sub-signatures without having to search for the entire signature. Representative sub-signatures that are concise and effective substantially reduce the time it takes to search the signatures database. A reduced search time allows the system to be more efficient. Accordingly, an important aspect of the system involves determining, before a search takes place, representative sub-signatures that are concise and effective.

In a first embodiment, a method is provided for generating a representative sub-signature of a particular cluster of signatures. The method comprises the following: reading a sub-signature of a signature of the particular cluster; calculating a first factor for the sub-signature, wherein the first factor is based on how many signatures in the particular cluster contain the sub-signature; calculating a second factor for the sub-signature, wherein the second factor is based on how many signatures in other clusters contain the sub-signature; and calculating an effectiveness score for the sub-signature, wherein the effectiveness score is based on at least the first factor and the second factor.

In a second embodiment, a system is provided for generating a representative sub-signature of a particular cluster of signatures. The system is configured for the following: reading a sub-signature of a signature of the particular cluster; calculating a first factor for the sub-signature, wherein the first factor is based on how many signatures in the particular cluster contain the sub-signature; calculating a second factor for the sub-signature, wherein the second factor is based on how many signatures in other clusters contain the sub-signature; and calculating an effectiveness score for the sub-signature, wherein the effectiveness score is based on at least the first factor and the second factor.

In a third embodiment, a computer readable medium comprises one or more instructions for generating a representative sub-signature of a particular cluster of signatures. The one or more instructions, when executed by one or more processors, cause the one or more processors to perform the following steps: reading a sub-signature of a signature of the particular cluster; calculating a first factor for the sub-signature, wherein the first factor is based on how many signatures in the particular cluster contain the sub-signature; calculating a second factor for the sub-signature, wherein the second factor is based on how many signatures in other clusters contain the sub-signature; and calculating an effectiveness score for the sub-signature, wherein the effectiveness score is based on at least the first factor and the second factor.

In some embodiments, the first factor preferably comprises increasing the first factor as the number of signatures containing the sub-signature in the particular cluster increases. The second factor preferably comprises increasing the second factor as the number of signatures in other clusters containing the sub-signature increases. The effectiveness score preferably comprises dividing the first factor by the second factor.

A signature is an identifier an item, such as, for example, a CD, a DVD, a Blu-ray Disc, an album, a song, a track or a chapter. Examples of a signature include without limitation an audio fingerprint, an audio identifier, a video identifier, a disc identifier, a CD identifier, a DVD identifier, a Blu-ray Disc identifier, a media identifier, a high definition media identifier, a human fingerprint, a human footprint, an animal fingerprint, an animal footprint, a handwritten signature, an eye print, a biometric identifier, a retinal identifier, a retinal scan, a DNA identifier, a DNA profile, a genetic identifier, and a genetic profile.

A signature is preferably a computer-readable string of characters that comports with a coding standard. Examples of a coding standard include without limitation alphabet, alphanumeric, decimal, hexadecimal, binary, American Standard Code for Information Interchange, Unicode, and Universal Character Set.

The invention encompasses other embodiments configured as set forth above and with other features and alternatives. It should be appreciated that the invention can be implemented in numerous ways, including as a method, a process, an apparatus, a system or a device.

BRIEF DESCRIPTION OF THE DRAWINGS

The invention will be readily understood by the following detailed description in conjunction with the accompanying drawings. To facilitate this description, like reference numerals designate like structural elements.

FIG. 3 is a schematic diagram of a cluster having representative sub-signatures, in accordance with some embodiments;

DETAILED DESCRIPTION

Figure 1:
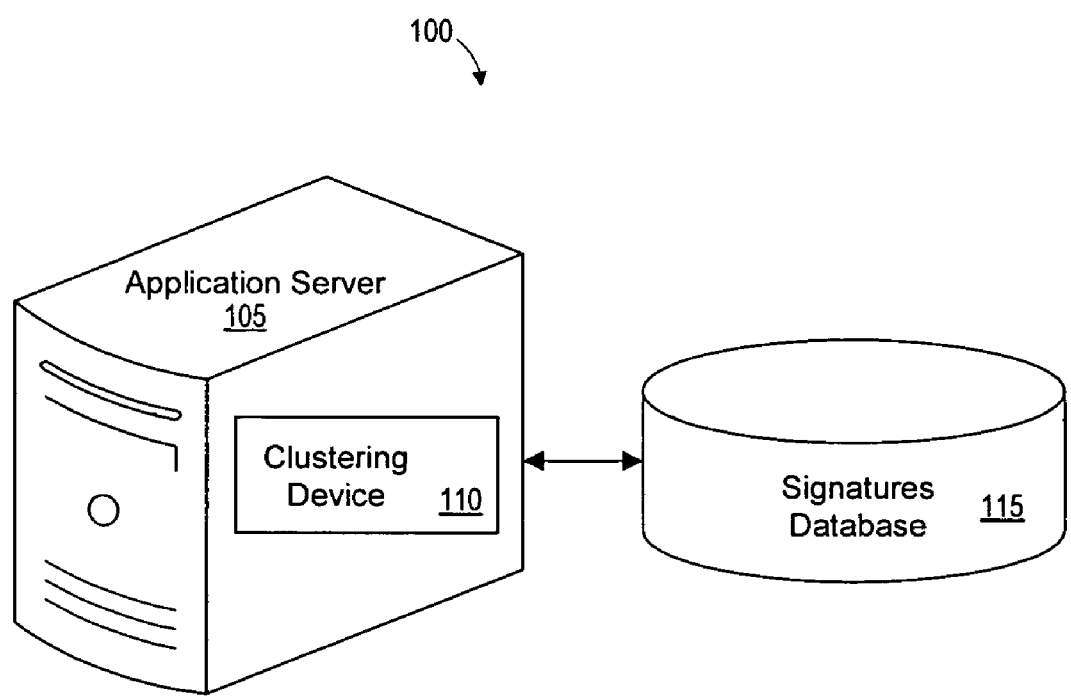
FIG. 1 is a block diagram of a system for generating a representative sub-signature of a cluster of signatures, in accordance with some embodiments.

An invention is disclosed for a method and a system for generating a representative sub-signature of a cluster of signatures by using weighted sampling. Numerous specific details are set forth in order to provide a thorough understanding of the invention. It will be understood, however, to one skilled in the art, that the invention may be practiced with other specific details.

Definitions

Some terms are defined below in alphabetical order for easy reference. These terms are not rigidly restricted to these definitions. A term may be further defined by its use in other sections of this description.

"Album" means a collection of tracks. An album is typically originally published by an established entity, such as a record label (e.g., recording company, such as Warner or Universal).

"Audio Fingerprint" (e.g., "fingerprint", "acoustic fingerprint", or "digital fingerprint") is a digital measure of certain acoustic properties that is deterministically generated from an audio signal that can be used to identify an audio sample and/or quickly locate similar items in an audio database. An audio fingerprint typically operates as a signature for a particular item, such as a CD, a DVD and/or a Blu-ray Disc. The term "signature" is defined below. An audio fingerprint is preferably an independent piece of data that is not affected by metadata. The company Macrovision® has databases that store over 25 million unique fingerprints for various audio samples. Practical uses of audio fingerprints include without limitation identifying songs, identifying records, identifying melodies, identifying tunes, identifying advertisements, monitoring radio broadcasts, monitoring peer-to-peer networks, managing sound effects libraries and/or identifying video files.

"Audio Fingerprinting" is the process of generating an audio fingerprint. U.S. Pat. No. 7,277,766, entitled "Method and System for Analyzing Digital Audio Files", which is herein incorporated by reference, provides an example of an apparatus for audio fingerprinting an audio waveform. U.S. Patent Publication No. 20060149533, entitled "Methods and Apparatus for Identifying Media Objects", which is herein incorporated by reference, provides an example of an apparatus for generating an audio fingerprint of an audio recording.

"Blu-ray", also known as Blu-ray Disc, means a disc format jointly developed by the Blu-ray Disc Association, and personal computer and media manufacturers (including Apple, Dell, Hitachi, HP, JVC, LG, Mitsubishi, Panasonic, Pioneer, Philips, Samsung, Sharp, Sony, TDK and Thomson). The format was developed to enable recording, rewriting and playback of high-definition video (HD), as well as storing large amounts of data. The format offers more than five times the storage capacity of conventional DVDs and can hold 25 GB on a single-layer disc and 500 GB on a 20-layer disc. More layers and more storage capacity may be feasible as well. This extra capacity combined with the use of advanced audio and/or video codecs offers consumers an unprecedented HD experience. While current disc technologies, such as CD and DVD, rely on a red laser to read and write data, the Blu-ray format uses a blue-violet laser instead, hence the name Blu-ray. The benefit of using a blue-violet laser (405 nm) is that it has a shorter wavelength than a red laser (650 nm). A shorter wavelength makes it possible to focus the laser spot with greater precision. This added precision allows data to be packed more tightly and stored in less space. Thus, it is possible to fit substantially more data on a Blu-ray Disc even though a Blu-ray Disc is the same size as a traditional CD or DVD.

"Chapter" means an audio and/or video data block on a disc, such as a Blu-ray Disc, a CD or a DVD. A chapter stores at least a portion of an audio and/or video recording.

"Client" means the client part of a client-server architecture. A client is typically a user device and/or an application that runs on a user device. A client typically relies on a server to perform some operations. For example, an e-mail client is an application that enables a user to send and receive e-mail via an email server.

"Cluster" means a set of alternative, yet similar, signatures that are likely to be identifiers of the same item. For example, a CD may have multiple similar signatures due to imperfections in pressings or readings, among other reasons. The set of similar signatures for that CD is referred to as a cluster. The term "signature" is defined below.

"Compact Disc" (CD) means a disc used to store digital data. A CD was originally developed for storing digital audio. Standard CDs have a diameter of 120 mm and can typically hold up to 80 minutes of audio. There is also the mini-CD, with diameters ranging from 60 to 80 mm. Mini-CDs are sometimes used for CD singles and typically store up to 24 minutes of audio. CD technology has been adapted and expanded to include without limitation data storage CD-ROM, write-once audio and data storage CD-R, rewritable media CD-RW, Super Audio CD (SACD), Video Compact Discs (VCD), Super Video Compact Discs (SVCD), Photo CD, Picture CD, Compact Disc Interactive (CD-i), and Enhanced CD. The wavelength used by standard CD lasers is 650 nm, and thus the light has a red color.

"Database" means a collection of data organized in such a way that a computer program may quickly select desired pieces of the data. A database is an electronic filing system. In some instances; the term "database" is used as shorthand for "database management system".

"Device" means software, hardware or a combination thereof. A device may sometimes be referred to as an apparatus. Examples of a device include without limitation a software application such as Microsoft Word®, a laptop computer, a database, a server, a display, a computer mouse, and a hard disk. Each device is configured to carry out one or more steps of the method of generating a representative sub-signature of a cluster of signatures.

"Digital Video Disc" (DVD) means a disc used to store digital data. A DVD was originally developed for storing digital video and digital audio data. Most DVDs are of the same dimensions as compact discs (CDs) but store more than six times as much data. There is also the mini-DVD, with diameters ranging from 60 to 80 mm. DVD technology has been adapted and expanded to include DVD-ROM, DVD-R, DVD+R, DVD-RW, DVD+RW and DVD-RAM. The wavelength used by standard DVD lasers is 650 nm, and thus the light has a red color.

"Effectiveness score" means a measurement of how well a particular sub-signature represents the given cluster.

"Fuzzy search" (e.g., "fuzzy string search" or "approximate string search") means a search for text strings that approximately or substantially match a given text string pattern. Fuzzy searching may also be known as approximate or inexact matching. An exact match may inadvertently occur while performing a fuzzy search.

"Metadata" generally means data that describes data. More particularly, metadata may be used to describe the contents of a digital audio/video recording. Such metadata may include, for example, song name, artist information (e.g., name, birth date, discography, etc.), album information (e.g., album title, review, track listing, sound samples, etc.), relational information (e.g., similar artists and albums, genre, etc.) and/or other types of supplemental information. Conventional optical discs (e.g., CDs, DVDs and Blu-ray Discs) do not typically contain metadata. Metadata may be attached to a digital recording (e.g., song, album, movie or video) after the digital recording has been ripped from an optical disc, converted to another digital audio format and stored on a hard drive.

"Network" means a connection between any two or more computers, which permits the transmission of data. A network may be any combination of networks, including without limitation the Internet, a local area network, a wide area network, a wireless network and a cellular network.

"Pressing" (e.g., "disc pressing") means producing a disc in a disc press from a master. The disc press preferably includes a laser beam having a bandwidth of less than about 650 nm, such as, for example, 405 nm.

"Representative sub-signature" is preferably a piece of the signature that is highly likely to be an effective representation of the cluster containing the sub-signature. The terms "signature" and "sub-signature" are defined below.

"Server" means a software application that provides services to other computer programs (and their users), in the same or other computer. A server may also refer to the physical computer that has been set aside to run a specific server application. For example, when the software Apache HTTP Server is used as the web server for a company's website, the computer running Apache is also called the web server. Server applications can be divided among server computers over an extreme range, depending upon the workload.

"Software" means a computer program that is written in a programming language that may be used by one of ordinary skill in the art. The programming language chosen should be compatible with the computer by which the software application is to be executed and, in particular, with the operating system of that computer. Examples of suitable programming languages include without limitation Object Pascal, C, C++ and Java. Further, the functions of some embodiments, when described as a series of steps for a method, could be implemented as a series of software instructions for being operated by a processor, such that the embodiments could be implemented as software, hardware, or a combination thereof. Computer readable media are discussed in more detail in a separate section below.

"Signature" means an identifier of an item. Examples of a signature include without limitation the following identifiers in a computer-readable format: an audio fingerprint, an audio identifier, a video identifier, a disc identifier, a CD identifier, a DVD identifier, a Blu-ray Disc identifier, a media identifier, a high definition media identifier, a human fingerprint, a human footprint, an animal fingerprint, an animal footprint, a handwritten signature, an eye print, a biometric identifier, a retinal identifier, a retinal scan, a DNA identifier, a DNA profile, a genetic identifier and/or a genetic profile, among other identifiers. A signature may be any computer-readable string of characters that comports with any coding standard in any language. Examples of a coding standard include without limitation alphabet, alphanumeric, decimal, hexadecimal, binary, American Standard Code for Information Interchange (ASCII), Unicode and/or Universal Character Set (UCS). Certain identifiers may not initially be computer-readable. For example, latent human fingerprints may be printed on a door knob in the physical world. Identifiers that are initially not computer-readable may be converted into computer-readable signatures by using any appropriate conversion technique. For example, a conversion technique for converting a latent human fingerprint into a computer-readable signature may include a ridge characteristics analysis.

"Sub-Signature" means any subset of a signature. The term "signature" is defined above. A cluster may have one or more representative sub-signatures.

"Song" means a musical composition. A song is typically recorded onto a track by a record label (e.g., recording company). A song may have many different versions, for example, a radio version and an extended version.

"System" means a device or multiple coupled devices. A device is defined above.

"Track" means an audio data block on a disc, such as a Blu-ray Disc, a CD or a DVD. A track stores at least a portion of an audio recording.

"User" means a consumer, client, and/or client device in a marketplace of products and/or services.

"User device" (e.g., "user computer", "client", or "client device") may refer to a single computer or to a network of interacting computers. A user device is a combination of a hardware system, a software operating system and preferably one or more software application programs. Examples of a user device include without limitation a Blu-ray Disc player, a personal media device, a portable media player, an iPod®, a Zoom Player, a laptop computer, a palmtop computer, a smart phone, a cell phone, a mobile phone, an mp3 player, a digital audio recorder, a digital video recorder, a CD player, a DVD player, an IBM-type personal computer (PC) having an operating system such as Microsoft Windows®, an Apple® computer having an operating system such as MAC-OS, hardware having a JAVA-OS operating system, and a Sun Microsystems Workstation having a UNIX operating system.

"Web browser" means any software program which can display text, graphics, or both, from Web pages on Web sites. Examples of a Web browser include without limitation Mozilla Firefox® and Microsoft Internet Explorer®.

"Web page" means any documents written in mark-up language including without limitation HTML (hypertext mark-up language) or VRML (virtual reality modeling language), dynamic HTML, XML (extended mark-up language) or related computer languages thereof, as well as to any collection of such documents reachable through one specific.

Internet address or at one specific Web site, or any document obtainable through a particular URL (Uniform Resource Locator).

"Web server" refers to a computer or other electronic device which is capable of serving at least one Web page to a Web browser. An example of a Web server is a Yahoo® Web server.

"Web site" means at least one Web page, and more commonly a plurality of Web pages, virtually connected to form a coherent group.

Overview of Architecture

FIG. 1 is a block diagram of a system 100 for generating a representative sub-signature of a cluster of signatures, in accordance with some embodiments. An application server 105 is coupled to a signatures database 115. The application server 105 includes a clustering device 110. A device is software, hardware or a combination thereof. A device may somimes be referred to as an apparatus. The clustering device 110 is configured to carry out the more important steps of the method of generating a representative sub-signature of a cluster of signatures.

The signatures database 115 may include clusters of signatures, as discussed below with reference to FIG. 2. A signature is an identifier of an item. One example of a signature is an audio fingerprint. An audio fingerprint is a digital measure of certain acoustic properties that is deterministically generated from an audio signal that can be used to identify an audio sample and/or quickly locate similar items in an audio database.

Signatures are not limited to being audio fingerprints. Other examples of a signature include without limitation the following identifiers in a computer-readable format: an audio identifier, a video identifier, a disc identifier, a CD identifier, a DVD identifier, a Blu-ray Disc identifier, a media identifier, a high definition media identifier, a human fingerprint, a human footprint, an animal fingerprint, an animal footprint, a handwritten signature, an eye print, a biometric identifier, a retinal identifier, a retinal scan, a DNA identifier, a DNA profile, a genetic identifier and/or a genetic profile, among other identifiers. A signature may be any computer-readable string of characters that comports with any coding standard in any language. Examples of a coding standard include without limitation alphabet, alphanumeric, decimal, hexadecimal, binary, American Standard Code for Information Interchange (ASCII), Unicode and/or Universal Character Set (UCS). Certain identifiers may not initially be computer-readable. For example, latent human fingerprints may be printed on a door knob in the physical world. Identifiers that are initially not computer-readable may be converted into computer-readable signatures by using any appropriate conversion technique. For example, a conversion technique for converting a latent human fingerprint into a computer-readable signature may include a ridge characteristics analysis.

It will be readily appreciated that the block diagram of FIG. 1 is for explanatory purposes, and that numerous variations are possible. For example, the clustering device 110 may be a standalone device outside of the application server 105. Also, the signatures database 115 may be a database system that includes multiple databases, among other devices.

Overview of Generating a Representative Sub-Signature of a Cluster

A system may use a signature to identify data during a search (e.g., fuzzy search). For example, a user may input a CD into a CD player of a user computer. The user computer may compute the CD's signature (e.g., audio fingerprint) upon detection of the disc in the CD player. The user computer may send the signature to a remote server to search for a matching record in a database that contains metadata about various CDs. The remote server may have signatures arranged in clusters. Each cluster of signatures may be associated with metadata for a particular CD. Upon finding a match for the queried signature, the remote server may send the metadata to the user computer. The user computer may then display the metadata.

For searching purposes, it is advantageous for each cluster in a database to have representative sub-signatures of clusters. The system preferably determines the representative sub-signatures before the system performs any searches in the clusters. In some embodiments, the system may subsequently perform a search by searching the representative sub-signatures without having to search the signatures themselves. Representative sub-signatures that are concise and effective substantially reduce the time it takes to search the signatures database. A reduced search time allows the system to be more efficient. Accordingly, an important aspect of the system involves determining, before a search takes place, representative sub-signatures that are concise and effective.

Referring to FIG. 1, the system 100 may be configured to search data related to an item by recognizing a cluster of known representative signatures of an item. A cluster is a set of alternative, yet similar, signatures that are likely to be identifiers of the same item. For example, a CD may have multiple similar signatures due to imperfections in pressings or readings, among other reasons. The set of similar signatures for the CD is referred to as a cluster. Accordingly, before a search takes place, the system 100 may cluster the known representative signatures into a cluster. The system 100 may then receive a query (e.g., unknown signature) and then search for a cluster that matches the query.

A cluster of signatures typically includes at least one of the following: all known signatures of the item to be recognized, a single representative signature and/or a representative subset of all known signatures. Clustering signatures allows a broad and accurate representative sub-signature of a given signature, which typically has allowable signature variations. As an example of signature variations, a CD may have multiple similar fingerprints due to imperfections in pressings or readings, among other reasons.

There are at least three approaches to the generation of a representative sub-signature of a cluster. In a first approach, the system 100 may use a single signature to represent the cluster. This approach produces a reasonably small representative sub-signature, but suffers when a single signature is not sufficiently similar to all instances of the item's signature. In a second approach, the system 100 may use all signatures in the cluster to represent the cluster. This approach produces an accurate but, unfortunately, an extremely large representative sub-signature of the cluster. In a third approach, the system 100 may use a signature subset that is most representative of the cluster in order to define the cluster space. This approach is an excellent general solution that allows a tradeoff between the size of and the accuracy of the representative sub-signature. Other approaches exist as well.

Figure 2:
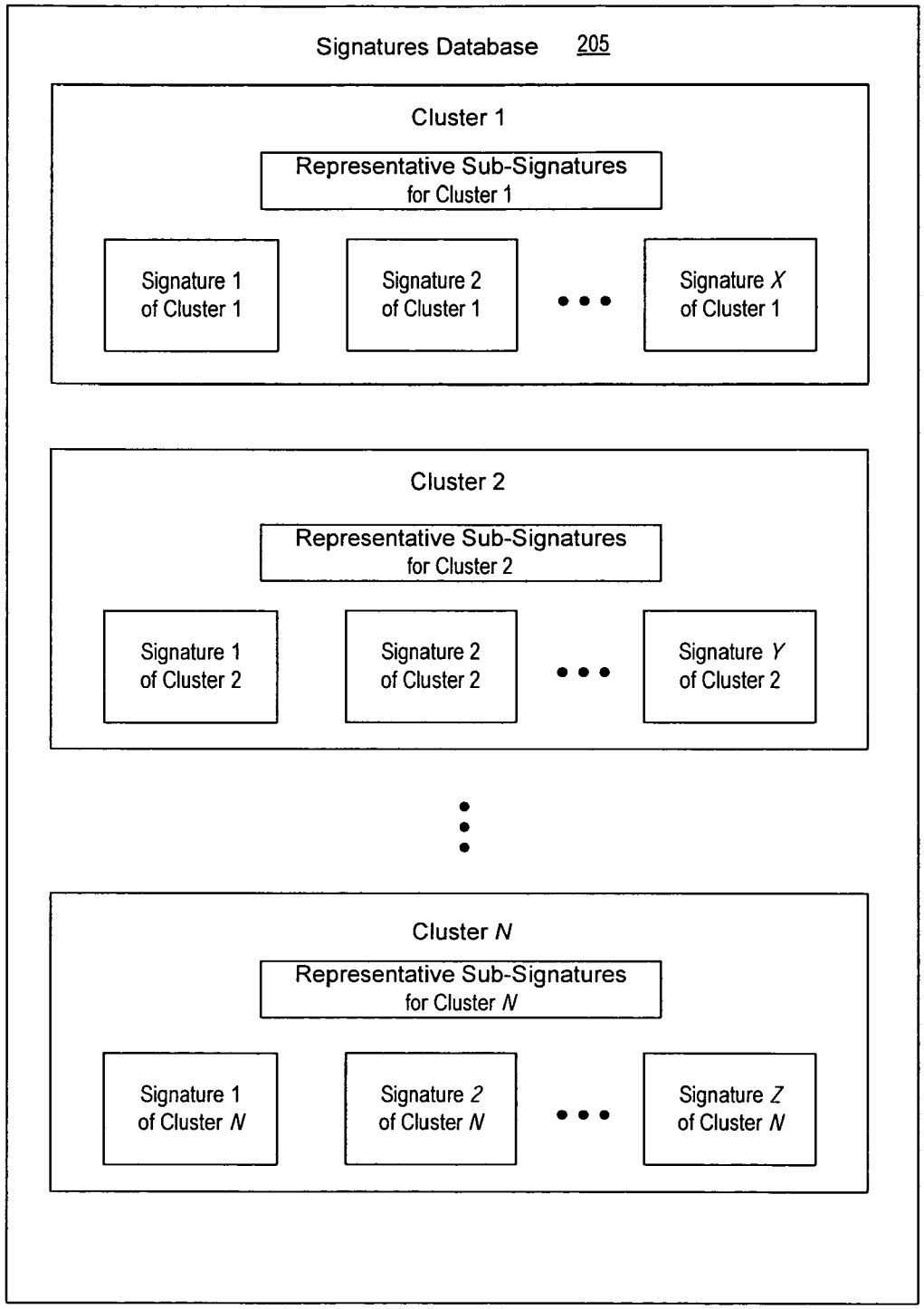
FIG. 2 is a block diagram of a signatures database, in accordance with some embodiments.

Generating a Representative Sub-Signature of a Cluster by Using Weighted Sampling FIG. 2 is a block diagram of a signatures database 205, in accordance with some embodiments. Generally, a signatures database preferably includes one or more clusters of signatures. For example, the signatures database 205 includes clusters 1 through N, where N is a positive integer.

Each cluster preferably includes one or more signatures. For example, cluster 1 includes signatures 1 through X of cluster 1, where X is a positive integer. Cluster 2 includes signatures 1 through Y of cluster 2, where Y is a positive integer. Cluster N includes signatures 1 through Z of cluster N, where Z is a positive integer.

Each signature includes one or more sub-signatures, typically a multitude of sub-signatures. A sub-signature is any subset of a signature. Consider, for example, the following signature of Table 1:

TABLE 1

Example Signature q q e p I d f j r r r k w l l l d f j

The signature of Table 1 is a relatively simple string of alphabetic characters that includes a multitude of sub-signatures. It can be readily seen that the signature of Table 1 includes many sub-signatures, including without limitation "qq", "qqe", "qqep", "pldfjrrrk", "rrrk" and so on. As is readily apparent, the number of different sub-signatures for this relatively simple signature is relatively large.

Referring to FIG. 2, it is advantageous for each cluster in the signatures database 205 to have one or more representative sub-signatures that are effective representative sub-signatures of the whole cluster. Accordingly, the system is configured to determine one or more representative sub-signatures for each cluster in the signatures database 205. For example, the system may determine representative sub-signatures for cluster 1. The system may determine representative sub-signatures for cluster 2. The system may determine representative sub-signatures for cluster N, where N is a positive integer.

The system-determines representative sub-signatures preferably before the system performs any searches in the clusters. In some embodiments, the system may subsequently perform a search in the signatures database 205 by searching the representative sub-signatures without having to search throughout the entire clusters. Representative sub-signatures that are both concise and effective, substantially reduce the time it takes to search a database. A reduced search time allows the system to be more efficient. Accordingly, an important aspect of the system involves determining representative sub-signatures that are both concise and effective.

FIG. 3 is a schematic diagram of a cluster 305 having representative sub-signatures 310, in accordance with some embodiments. As described above with reference to FIG. 2, a cluster preferably includes one or more signatures. Likewise, in FIG. 3, the cluster 305 includes signatures 1 through W of cluster 305, where W is a positive integer.

The system is configured to analyze the signatures of each cluster of a database system. For example, the system is configured to analyze the signatures within the cluster 305, among other clusters. Based on the analysis, the system may determine representative sub-signatures 310 of the signatures of the cluster 305. The representative sub-signatures 310 are preferably a highly effective representative sub-signature of the whole cluster 305.

The effectiveness of a sub-signature is based on a weighted sampling of sub-signatures of signatures in the signatures database. The weighted sampling involves analyzing a particular sub-signature by using at least two factors, discussed below, to calculate an effectiveness score for the particular sub-signature. The effectiveness score is a measurement of how well a particular sub-signature represents the given cluster.

Equations 1, 2 and 3 are provided below for the weighted sampling. It will be readily appreciated that Equations 1, 2 and 3 are for explanatory purposes. The system may be configured to use other equations to quantify the effectiveness score for each sub-signature.

A first factor may be quantified according to Equation 1 below:

First Factor for Effectiveness      Formula 1

$$\text{First Factor} = \frac{\text{Score for a Particular Sub-Signature}}{\text{total number of signatures in the present cluster}}$$

$$= \frac{\text{number of signatures containing particular subsignature in the present cluster}}{\text{total number of signatures in the present cluster}}.$$

The first factor is how common a particular sub-signature is within the cluster that contains the sub-signature. A sub-signature that is more common within the cluster that contains the sub-signature will tend to yield a relatively higher first factor for the effectiveness score of Equation 3 below. Likewise, a sub-signature that is less common within the signature that contains the sub-signature will tend to yield a relatively lower first factor for the effectiveness score of Equation 3 below. Thus, a sub-signature that is more common within the cluster is more desirable than a sub-signature that is less common within the cluster.

A second factor may be quantified according to Equation 2 below:

Second Factor for Effectiveness      Formula 2

Score for a Particular Sub-Signature $$\text{Second Facor} = \frac{\text{number of signatures in other clusters that contain the particular subsignature in other clusters}}{\text{total number of other signatures in other clusters}}.$$

The second factor is how unique a particular sub-signature is among substantially all clusters in a database. For this second factor, a sub-signature that is more unique among substantially all clusters will tend to yield a relatively lower second factor for the effectiveness score. Likewise, a sub-signature that is less unique among substantially all clusters will tend to yield a relatively higher second factor for the effectiveness score. Thus, a sub-signature that is more unique among substantially all clusters is more desirable than a sub-signature that is less unique among substantially all clusters.

The effectiveness score for a particular sub-signature may be quantified according to Equation 3 below.

Effectiveness Score for a Particular Sub-Signature      Equation 3

$$\text{Effectiveness Score} = \frac{\text{First Factor}}{\text{Second Factor}}.$$

The effectiveness score is a measurement of how well a particular sub-signature represents the given cluster. According to Equation 3, as the first factor for a particular sub-signature increases, the effectiveness score for that sub-signature increases. Vice versa, as the first factor for a particular sub-signature decreases, the effectiveness score for that sub-signature decreases. As the second factor for a particular sub-signature increases, the effectiveness score for that particular sub-signature decreases. Vice versa, as the second factor for a particular sub-signature decreases, the effectiveness score for that particular sub-signature increases. If the second factor for a particular sub-signature happens to be zero, then that means that particular sub-signature is highly unique to the present cluster. (See Equation 2 above.) In such a case when the second factor is zero, the second factor is assigned a best possible relative score for that particular sub-signature.

As mentioned above, the effectiveness score for a particular sub-signature may not be exclusively dependent on the two factors. Other factors may affect the effectiveness score. As stated above, it will be readily appreciated that Equations 1, 2 and 3 are for explanatory purposes. The system may be configured to use other equations to quantify the effectiveness score for each sub-signature. For example, the effectiveness score may give more weight to the first factor as compared to the second factor, or vice versa. More weight may be given to the first factor as compared to the second factor, for example, if the first factor is more accurate for determining the effectiveness score than is the second factor. The system may happen to analyze a greater amount of quality data for the first factor, as opposed to the second factor. There may be, for example, more signatures available for analysis with respect to the first factor, and fewer signatures available for analysis with respect to the second factor. Vice versa, more weight may be given to the second factor as compared to the first factor, for example, if the second factor is more accurate for determining the effectiveness score than is the first factor. The system may happen to analyze a greater amount of quality data for the second factor, as opposed to the first factor. There may be, for example, more signatures available for analysis with respect to the second factor, and fewer signatures available for analysis with respect to the first factor.

Referring to FIG. 3, the sample signatures of cluster 305 are strings of alphabetic characters.

Signature 1 of cluster 305 is the following:
hhhcchrrlllxxttttvvjjccsssx-yzhppprrvvttxxiiijxxcwlllhhl-labcfeemintttxccvvvjjrrssff fhhaaanniiiggcucjjjvvvl-leaaafffhhhlleewwccvvvjjjuccennnbbbxuuuuwwwemm.

Signature 2 of cluster 305 is the following:
cccccrrrrllmmttvbccsssswwrrop-pprrvttiiiccjxxgglllllappfeemmabcttnchhrrrrssfffhha aanniitxxguuxyzjjjvvbblleaaafffhhl.

Signature W of cluster 305 is the following:
gghhhchhrrabclllxxttttvvc-ccsssshhhppprmvvtttxxi-ixxxglllxyzfeemmnnttbccvvjjjcc ssfffhhaaanniiigccv-vjjjvvvlleaaafffhh.

Using Equation 3 above, the system may compare the effectiveness score of a particular sub-signature to other effectiveness scores of other sub-signatures in the present cluster 305. According to the first factor in this case, the system determines that the sub-signatures "abc" and "xyz" are relatively common within the cluster 305. According to the second factor for these sub-signatures, the system determines that the sub-signatures "abc" and "xyz" are relatively unique among substantially all sub-signatures of substantially all clusters (not shown) in the signatures database. In this case, the system determines that the sub-signatures "abc" and "xyz" have the substantially highest effectiveness scores among sub-signatures in the present cluster 305. The system determines the representative sub-signatures 310 for cluster 305 to be the three-character sub-signatures of "abc" and "xyz". Thus, the representative sub-signatures 310 "abc" and "xyz" are likely to be effective representative sub-signatures of the whole cluster 305.

For explanatory purposes, the description of FIG. 3 considers sub-signatures in which each sub-signature has a fixed length of three characters. However, the system is not limited to comparing sub-signatures of a fixed length of three characters. Other implementations may involve sub-signatures of other lengths and/or even non-fixed lengths. In some embodiments, the system may compare sub-signatures having lengths that are different from one another.

Optimizing the Process of Generating a Representative Sub-Signature of a Cluster As discussed above with reference to Table 1, even a signature that is relatively simple may have a relatively large number of sub-signatures. The signatures of the cluster 305 of FIG. 3 are more complex than the relatively simple signature of Table 1 discussed above. Accordingly, the system may have a relatively large number of sub-signatures to process. However, based on a distribution of the frequencies of sub-signatures, it may be readily apparent that the system may not need to calculate effectiveness scores for all sub-signatures within a given cluster. Such a distribution is discussed below with reference to FIG. 4.

Figure 4:
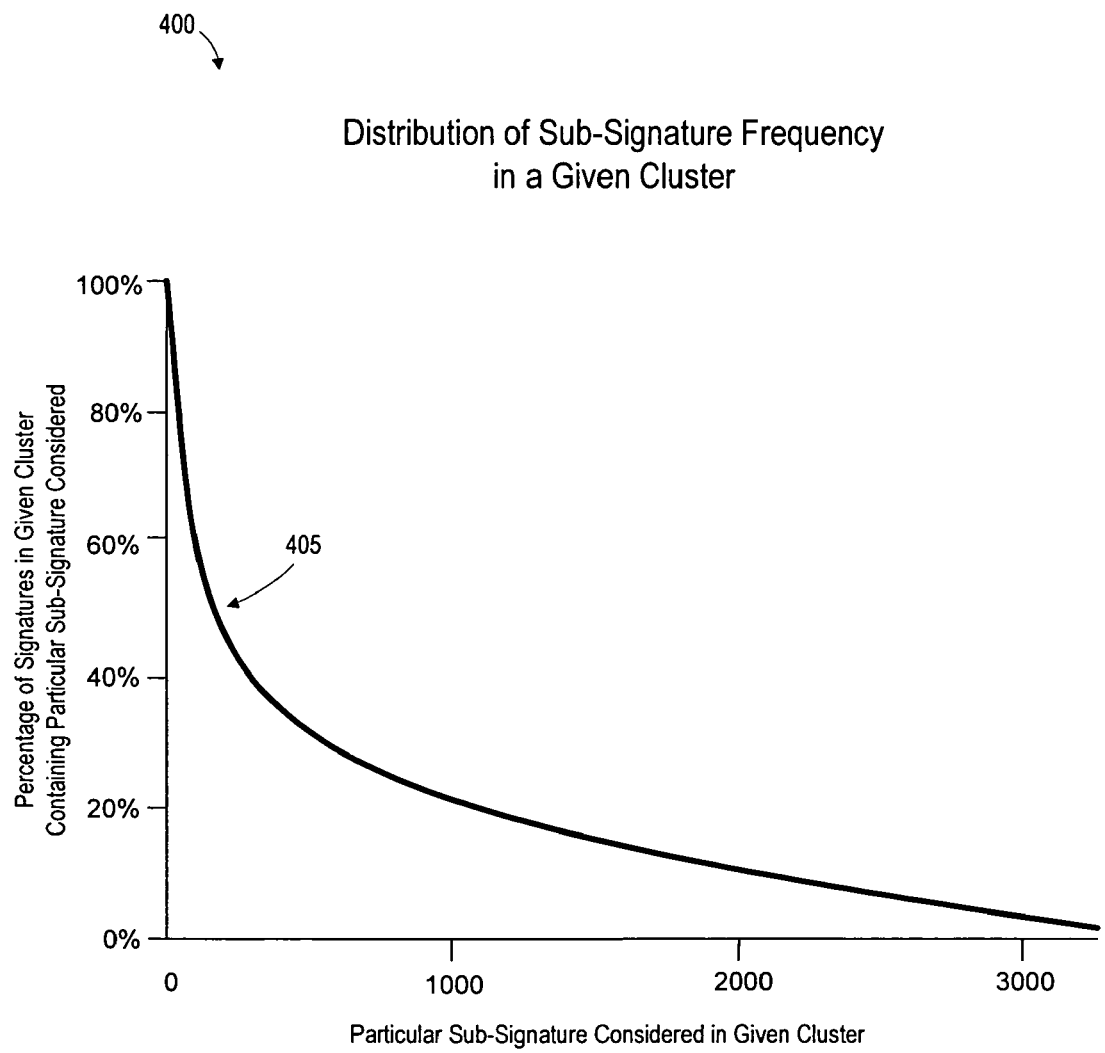
FIG. 4 is an example of a distribution of a sub-signature frequency in a given cluster, in accordance with some embodiments.

FIG. 4 is an example of a distribution 400 of a sub-signature frequency in a given cluster, in accordance with some embodiments. For explanatory purposes, the given cluster of FIG. 4 includes 3200 sub-signatures as shown by the horizontal axis of the graph. This distribution 400 considers sub-signatures in which each sub-signature has a fixed length of three characters (not shown). However, the system is not limited to comparing sub-signatures of a fixed length of three characters. Other implementations may involve sub-signatures of other lengths and/or even non-fixed lengths. In some embodiments, the system may compare sub-signatures having lengths that may be different from one another.

According to the first factor discussed above, the system takes into account how frequently a particular sub-signature occurs in the given cluster. (See Equation 1 above.) An operator of the system may decide that only sub-signatures that occur in at least half of the signatures are candidates for representing a given cluster. Accordingly, the system may be configured to consider only sub-signatures that occur in at least half of the signatures of the given cluster. At point 405 of the distribution 400, it is shown that only 158 out of 3200 (about 4.9%) of the sub-signatures occur in at least 50% of the signatures of the given cluster. If it is determined that only sub-signatures that occur in at 50% of the entries are candidates for representing the cluster, then the system only has to consider these sub-signatures for further processing. In this case, the system only needs to compute effectiveness scores for about 4.9% (158 out of 3200) of the total sub-signatures in the given cluster.

As a further explanation of the first factor, a sub-signature that occurs in 100% of the signatures is likely more representative than a sub-signature that occurs in, for example, only 2% of the signatures of the given cluster. The system does not have to consider such sub-signatures that occur in less than a certain percentage of signatures. When the system only considers the most representative sub-signatures of the signatures, then the system has to analyze further only a fraction of the sub-signatures in order to provide an excellent representative sub-signature of the whole cluster. In this case, that fraction is $158/3200$, which is depicted by point 405 of FIG. 4.

According to the second factor discussed above, the system may further improve results by taking into account how frequently the given sub-signature occurs across all clusters, not just within the present cluster. (See Equation 2 above.) For the second factor of the process, the system may continue analyzing the sub-signatures that remain after the system applies the first factor. If a particular sub-signature occurs in every signature in a given cluster, then that particular sub-signature may initially be considered to be a candidate for representing the given cluster according to the first factor. However, if that particular sub-signature also occurs in most of the other clusters, then that particular sub-signature is actually a poor candidate for representing the given cluster according to the second factor. The effectiveness score will likely be relatively low for that particular sub-signature because the effectiveness score takes into account at least the first factor and the second factor. (See Equation 3 above.)

Accordingly, the system is configured to select preferably one or more representative sub-signatures by using the effectiveness scores of the sub-signatures. Note that the effectiveness scores may reveal that there are no suitable sub-signatures to represent the cluster as a whole. It may be possible to have no representative sub-signatures if, for example, no sub-signatures meet minimum predetermined requirements for the first factor, the second factor and/or the effectiveness score.

By considering at least the two factors discussed above, the system calculates an effectiveness score for each sub-signature that occurs within a given cluster. The first factor may allow the system to eliminate a large group of sub-signatures that are likely to be ineffective. The system may analyze the remaining sub-signatures by using the second factor. The system is configured to favor more heavily the sub-signatures that have the higher effectiveness scores.

Using effectiveness scores is a highly accurate way to generate an excellent representative sub-signature of a cluster. Meanwhile preliminarily eliminating ineffective sub-signatures substantially decreases the amount of data that the system needs to process.

Overview of Method for Generating a Representative Sub-Signature of a Cluster

Figure 5:
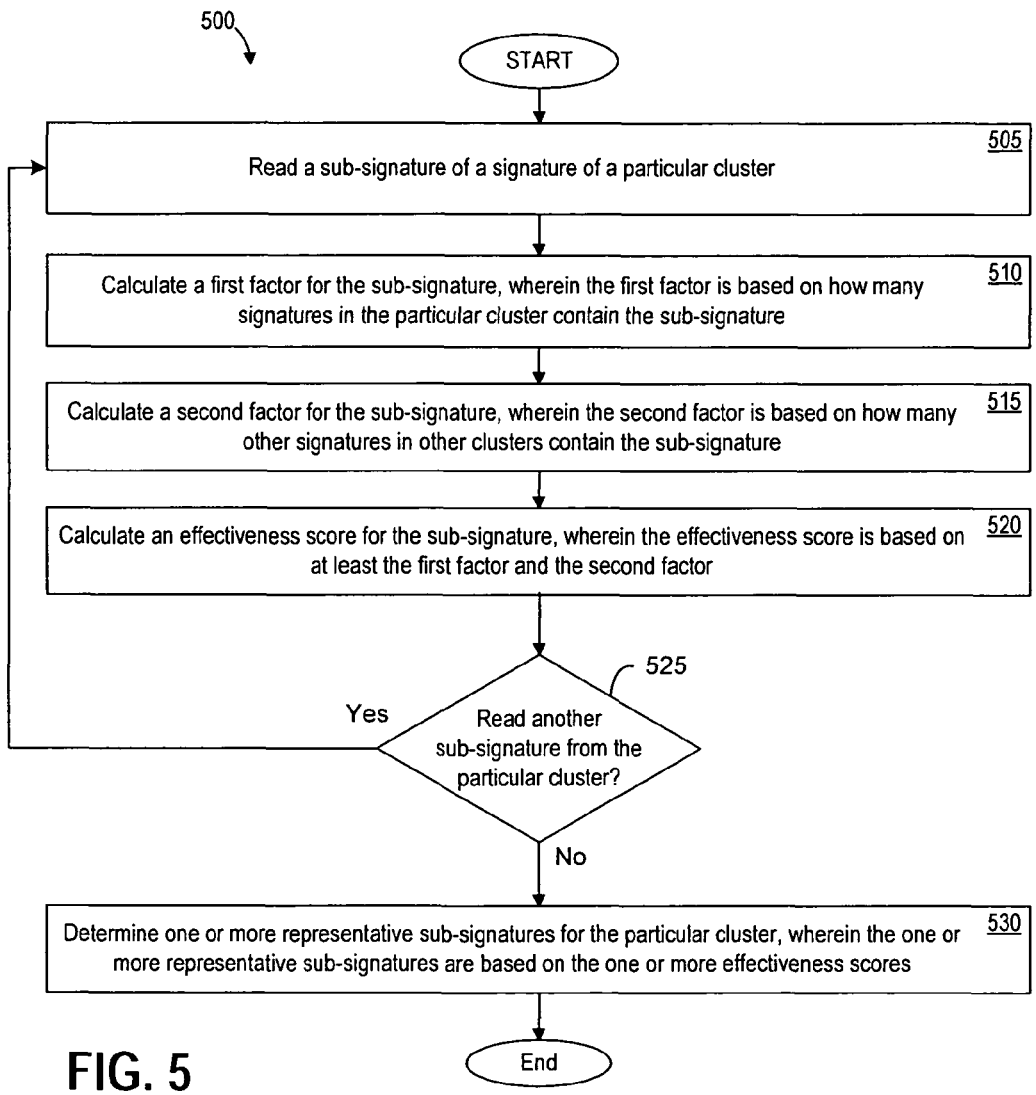
FIG. 5 is a flowchart of a method for generating a representative sub-signature of a cluster, in accordance with some embodiments.

FIG. 5 is a flowchart of a method 500 for generating a representative sub-signature of a cluster, in accordance with some embodiments. In some implementations, the steps of the method 500 may be carried out by the clustering device 110 of FIG. 1.

The method 500 starts in a step 505 where the system reads a sub-signature of a signature of a particular cluster. As explained above with reference to Table 1, a typical signature is likely to have a multitude of sub-signatures.

The method 500 then moves to a step 510 where the system calculates a first factor for the sub-signature. The first factor is based on how many signatures contain the sub-signature. The signatures in consideration for this first factor are in the particular cluster. Preferably, the first factor increases as the number signatures containing the sub-signature increases. Likewise, the first factor preferably decreases as the number of signatures containing the sub-signature decreases. Equation 1 above provides a quantitative example of the first factor.

Next, in a step 515, the system calculates a second factor for the sub-signature. The second factor is based on how many signatures in other clusters contain the sub-signature. These other signatures in consideration for this second factor are not in the particular cluster that is currently being considered. Preferably, the second factor increases as the number increases for signatures in other clusters containing the sub-signature. Vice versa, the second factor preferably decreases as the number of signatures in other clusters containing the sub-signature decreases. Equation 2 above provides a quantitative example of the second factor.

The method 500 then proceeds to a step 520 where the system calculates an effectiveness score for the sub-signature. The effectiveness score is based on at least the first factor and the second factor. One example of the effectiveness score may be the first factor divided by the second factor. Other examples exist as well. Equation 3 above provides a quantitative example of the effectiveness score.

The method 500 then moves to a decision operation 525 where the system determines if another sub-signature is to be read from the particular cluster in question. If another sub-signature is to be read from the particular cluster, then the method 500 returns to the step 505 where the system reads another sub-signature of a signature of the particular cluster. As explained above with reference to Table 1, there are likely to be a multitude of sub-signatures to read. The steps 505-520 repeat until the system analyzes all of the sub-signatures that are in consideration for representing the particular cluster.

In decision operation 525, when the system determines that another sub-signature is not to be read from the particular cluster, then the method 500 continues to a step 530 where the system determines one or more representative sub-signatures for the particular cluster. The one or more representative sub-signatures are based on the one or more effectiveness scores that the system calculated. Preferably, the one or more representative sub-signatures have the highest effectiveness scores in the particular cluster. The one or more representative sub-signatures are likely to be an effective representative sub-signature of the particular cluster. The method concludes after this step 530.

Note that the method 500 may include other details and steps that are not discussed in this method overview. Other details and steps are discussed above with reference to the appropriate figures and may be a part of the method 500, depending on the embodiment. For example, the method 500 may be optimized by performing a preliminary elimination of sub-signatures by using the first factor. Such an optimization is discussed above with reference to FIG. 4. As another example, the method 500 may further comprise generating representative sub-signatures for other clusters besides the particular cluster of this method overview. Other examples of details and steps exist as well.

Searching Data by Using Representative Sub-Signatures of Clusters

Figure 6:
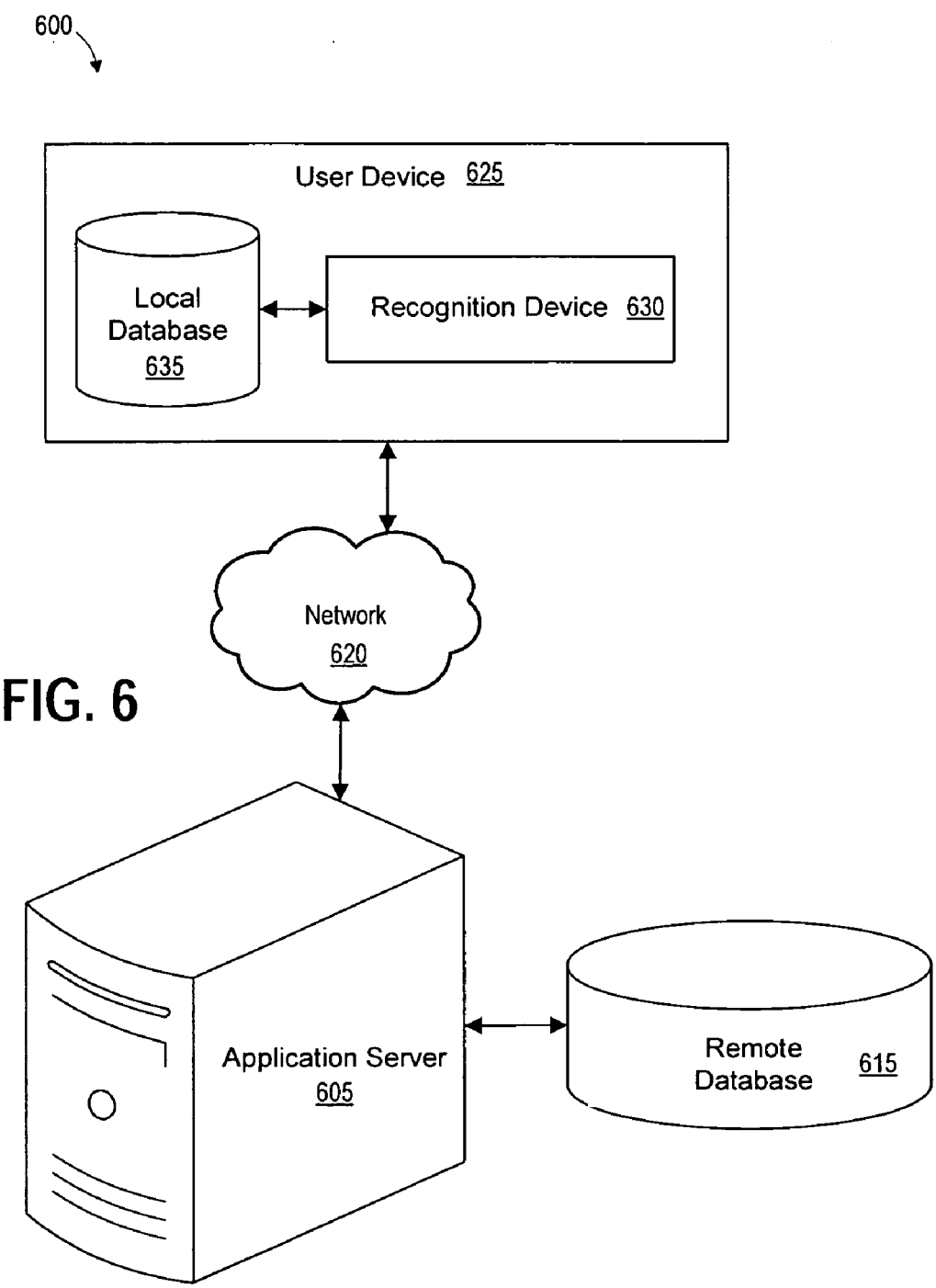
FIG. 6 is a block diagram of a system that is networked and configured for searching data related to an item, in accordance with some embodiments.

FIG. 6 is a block diagram of a system 600 that is networked and configured for searching data related to an item, in accordance with some embodiments. The data may be organized according to signatures. For example, the data may be metadata that is organized according audio fingerprints. In other examples, the data may be information that is organized according to a disc identifier or to a human fingerprint. Other examples of data organized into representative sub-signatures exist as well.

The signatures may be arranged in clusters, as described above with reference to FIG. 2. During a search, recognizing a cluster may occur more efficiently by searching representative sub-signatures of clusters, instead of the signatures within the clusters. Representative sub-signatures of clusters are described in detail above with reference to the appropriate figures.

The user device 625 includes without limitation a recognition device 630 and a local database 635. The recognition device 630 performs the more important operations of recognizing an item. The user device 625 may be, for example, a standalone disc player or a laptop computer, among other things. The recognition device 630 is coupled to the local database 635. The local database 635 may store, among other things, data collected and/or generated from an item (e.g., a disc) that is inputted into the user device 625. In other embodiments, the local database 635 may be located externally to the user device 625. Other configurations between the local database 635 and the recognition device 630 exist as well.

The recognition device 630 may be configured for recognizing an item, such as, for example, a song, an album and/or a disc, among other items. Recognizing an item may involve generating a signature for the item. For example, recognizing a song may involve generating an audio fingerprint of the song. U.S. patent applications (entitled "Storing an Internal Identifier in Metadata"), AMG0015 (entitled "Recognizing a Disc"), and AMG0025 (entitled "Recognizing a Disc"), which are hereby incorporated by reference, provide examples of methods for recognizing an item, such as, for example, a track, an album and a disc, among other items. U.S. patent applications (application Ser. No. 10/905,360, entitled "Method and Apparatus for Identifying Media Objects"), and AMG0006 (application Ser. No. 10/905,362, entitled "Methods and Apparatus for Audio Recognition"), which are hereby incorporated by reference, provide examples of audio fingerprinting.

A network 620 is coupled to an application server 605 and the user device 625. The network 620 may also be coupled to other user devices (not shown). The application server 605 is coupled to (or includes) a remote database 615. The remote database 615 may store, among other things, data collected and/or generated from an item inputted into the user device 625. The data in the remote database 615 may be identified by signatures, which may be arranged in clusters, as described above with reference to FIG. 2.

The user device 625 includes hardware and/or software configured for communicating with the application server 605 to retrieve and send information corresponding to a signature. For example, the user device 625 may have an operating system with a graphical user interface (GUI) to access the Internet and is preferably equipped with World Wide Web (Web) browser software, such as Mozilla Firefox®, operable to read and send Hypertext Markup Language (HTML) forms from and to a Hypertext Transport Protocol (HTTP) server on the Web. A standalone disc player may have a built-in interface that enables the player to communicate with the application server 605 via the network 620, either directly or through another computer. For example, a disc player may have a data interface (e.g., an IDE interface or a USB interface) that enables the disc player to send and receive data from a laptop computer, which in turn is coupled to the network 620.

Likewise, the application server 605 includes software and/or hardware for communicating with the user device 625. For example, the application server 605 may have HTTP compliant software, an operating system and common gateway interface (CGI) software for interfacing with the user device 625 via the network 620. Alternatively, the application server 605 and user device 625 may run proprietary software that enables them to communicate via the network 620.

It will be readily appreciated that the schematic of FIG. 6 is for explanatory purposes, and that numerous variations are possible. For example, the application server 605 may be connected to a local area network (LAN), which in turn may be connected to the network 620. In another example, the application server 605 may be coupled to multiple Web servers. In yet another example, the system 600 may include a database (or system of databases) arranged in a different configuration than the databases depicted here.

Some or all software and data necessary for recognizing an item may be stored on a local storage device associated with the user device 625. For example, the local database 635 may contain a complete set or a subset of the information available in the corresponding remote database 615 coupled to the application server 605. The user device 625 may load the local database 635 with data and signatures from a CD-ROM (not shown). The local database 635 may be on the hard disk of the user device 625. Alternatively, the user device 625 may download data to the local database 635 from the remote database 615 via the network 620. Other configurations exist as well.

Accordingly, the user device 625 may access the remote database 615 via the network 620. Alternatively, the user device 625 may download at least a portion of the data from the remote database 615 to the local database 635. The user device 625 may then provide relevant data according to a recognized signature in the local database 635 or the remote database 615. Such recognition may occur more efficiently by searching representative sub-signatures of clusters. These representative sub-signatures of clusters are described in detail above with reference to the appropriate figures.

For example, the user may insert a disc while the user device 625 is offline. The disc may be, for example, a Blu-ray Disc. The user device 625 may then provide the relevant metadata automatically by accessing the local database 635 according to the signature. The user device 625 may also retrieve the relevant metadata from the local database 635 upon the user's request. Examples of metadata include without limitation song title, artist name and album title.

In another example, the user may insert a disc while the user device 625 is coupled to the network 620. The disc may be, for example, a Blu-ray Disc. The application server 605 may then provide the relevant metadata automatically by accessing the remote database 615 according to the signature. The user device 625 may also retrieve the relevant metadata from the remote database 615 upon the user's request.

Computer Readable Medium Implementation

Portions of the invention may be conveniently implemented by using a conventional general purpose or a specialized digital computer or microprocessor programmed according to the teachings of the present disclosure, as will be apparent to those skilled in the computer art. Appropriate software coding can readily be prepared by skilled programmers based on the teachings of the present disclosure. Some embodiments may also be implemented by the preparation of application-specific integrated circuits or by interconnecting an appropriate network of conventional component circuits.

Some embodiments may include a computer program product which is a storage medium/media having instructions stored thereon/therein which can be used to control, or cause, a computer to perform any of the processes of the invention. The storage medium may include without limitation floppy disk, mini disk, optical disc, Blu-ray Disc, DVD, CD-ROM, micro-drive, magneto-optical disk, ROM, RAM, EPROM, EEPROM, DRAM, VRAM, flash memory, flash card, magnetic card, optical card, nanosystems, molecular memory integrated circuit, RAID, remote data storage/archive/warehousing, and/or any other type of device suitable for storing instructions and/or data.

Stored on any one of the computer readable medium/media, some implementations include software for controlling both the hardware of the general/special computer or microprocessor, and for enabling the computer or microprocessor to interact with a human user or other mechanism utilizing the results of the invention. Such software may include without limitation device drivers, operating systems, and user applications. Ultimately, such computer readable media further includes software for performing aspects of the invention, as described above.

Included in the programming/software of the general/special purpose computer or microprocessor are software modules for implementing the processes described above. The processes described above may include without limitation the following: reading a sub-signature of a signature of the particular cluster, calculating a first factor for the sub-signature, calculating a second factor for the sub-signature, and calculating an effectiveness score for the sub-signature, wherein the effectiveness score is based on at least the first factor and the second factor.

Advantages

Representative sub-signatures that are both concise and effective, substantially reduce the time it takes to search a signatures database. A reduced search time allows the system to be more efficient. Accordingly, an important aspect of the system involves determining, before a search takes place, representative sub-signatures that are both concise and effective.

Embodiments of the system allow highly efficient recognition of an item, such as, for example, a song, an album and/or a disc, among other things. For example, the system allows for highly efficient fingerprint clustering. The increased efficiency increases scalability. For example, the system may efficiently search increasingly larger data sets of fingerprints, among other things. The system increases responsiveness during searches of databases that have signatures arranged in clusters.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for generating a representative sub-signature of a particular cluster of signatures, the method comprising:
    reading a sub-signature of a signature of the particular cluster, wherein the signature includes an identifier of an item;
    calculating a first factor for the sub-signature, wherein the first factor is based on how many signatures in the particular cluster contain the sub-signature;
    calculating a second factor for the sub-signature, wherein the second factor is based on how many signatures in other clusters contain the sub-signature;
    calculating an effectiveness score for the sub-signature, wherein the effectiveness score is based on at least the first factor and the second factor;
    determining one or more representative sub-signatures for the particular cluster, wherein the one or more sub-signatures are based on one or more effectiveness scores; and
    at least one of:
    reading one or more additional sub-signatures of a signature of the particular cluster;
    calculating a first factor for each additional sub-signature;
    calculating a second factor for each additional sub-signature; and
    calculating an effectiveness score for each additional sub-signature,
    wherein calculating the first factor comprises increasing the first factor as the number of signatures containing the sub-signature in the particular cluster increases,
    wherein calculating the second factor comprises increasing the second factor as the number of signatures in other clusters containing the sub-signature increases, and
    wherein calculating the effectiveness score comprises dividing the first factor by the second factor.

2. The method of claim 1, wherein calculating the effectiveness score comprises giving more weight to the first factor as compared to the second factor, wherein the first factor is more accurate for determining the effectiveness score than is the second factor.

3. The method of claim 1, wherein calculating the effectiveness score comprises giving less weight to the first factor as compared to the second factor, wherein the second factor is more accurate for determining the effectiveness score than is the first factor.

4. The method of claim 1, further comprising optimizing the generation of the representative sub-signature of the particular cluster, wherein the optimizing comprises considering sub-signatures that are likely to be effective representative sub-signatures of the particular cluster.

5. The method of claim 1, further comprising optimizing the generation of the representative sub-signature of the particular cluster, wherein the optimizing comprises eliminating from consideration at least one of:
    one or more sub-signatures that are unlikely to be an effective representative sub-signature of the particular cluster;
    one or more sub-signatures by using the first factor;
    one or more sub-signatures that do not occur in at least a predetermined percentage of signatures of the particular cluster; and
    one or more sub-signatures that do not occur in at least fifty percent of the signatures of the particular cluster.

6. The method of claim 1, wherein the signature includes at least one of:
    a computer-readable format; and
    a computer-readable string of characters that comports with a coding standard.

7. The method of claim 1, wherein the item includes at least one of:
    a CD;
    a DVD;
    a Blu-ray Disc;
    an album;
    a song;
    a track; and
    a chapter.

8. The method of claim 1, wherein the signature includes at least one of:
    an audio fingerprint;
    an audio identifier;
    a video identifier;
    a disc identifier;
    a CD identifier;
    a DVD identifier;
    a Blu-ray Disc identifier;
    a media identifier;
    a high definition media identifier;
    a human fingerprint;
    a human footprint;
    an animal fingerprint;
    an animal footprint;
    a handwritten signature;
    an eye print;
    a biometric identifier;
    a retinal identifier;
    a retinal scan;

a DNA identifier;
a DNA profile;
a genetic identifier; and
a genetic profile.

9. The method of claim 1, wherein the signature includes a computer-readable string of characters that comports with a coding standard, and wherein the coding standard includes at least one of:
   alphabet;
   alphanumeric;
   decimal;
   hexadecimal;
   binary;
   American Standard Code for Information Interchange;
   Unicode; and
   Universal Character Set.

10. The method of claim 1, wherein the signature includes an identifier that is initially not computer-readable, and wherein the method further comprises converting the identifier into a computer-readable signature.

11. The method of claim 10, wherein the sub-signature comprises a subset of the computer readable signature, and wherein the identifier that is initially not computer-readable includes at least one of:
    a human fingerprint;
    a human footprint;
    an animal fingerprint;
    an animal footprint;
    a handwritten signature;
    an eye print;
    a biometric identifier;
    a retinal identifier;
    a retinal scan;
    a DNA identifier;
    a DNA profile;
    a genetic identifier; and
    a genetic profile.

12. The method of claim 1, wherein a cluster includes a set of alternative signatures that are likely to be identifiers of a same item.

13. A system for generating a representative sub-signature of a particular cluster of signatures, wherein the system includes at least one processor configured to perform the steps of:
    reading a sub-signature of a signature of the particular cluster, wherein the signature includes an identifier of an item;
    calculating a first factor for the sub-signature, wherein the first factor is based on how many signatures in the particular cluster contain the sub-signature;
    calculating a second factor for the sub-signature, wherein the second factor is based on how many signatures in other clusters contain the sub-signature;
    calculating an effectiveness score for the sub-signature, wherein the effectiveness score is based on at least the first factor and the second factor; and
    determining one or more representative sub-signatures for the particular cluster, wherein the one or more sub-signatures are based on one or more effectiveness scores; and
    at least one of:
    reading one or more additional sub-signatures of a signature of the particular cluster;
    calculating a first factor for each additional sub-signature;
    calculating a second factor for each additional sub-signature; and
    calculating an effectiveness score for each additional sub-signature,
    wherein calculating the first factor comprises increasing the first factor as the number of signatures containing the sub-signature in the particular cluster increases,
    wherein calculating the second factor comprises increasing the second factor as the number of signatures in other clusters containing the sub-signature increases, and
    wherein calculating the effectiveness score comprises dividing the first factor by the second factor.

14. The system of claim 13, wherein calculating the effectiveness score comprises giving more weight to the first factor as compared to the second factor, wherein the first factor is more accurate for determining the effectiveness score than is the second factor.

15. The system of claim 13, wherein calculating the effectiveness score comprises giving less weight to the first factor as compared to the second factor, wherein the second factor is more accurate for determining the effectiveness score than is the first factor.

16. The system of claim 13, wherein the at least one processor is further configured for optimizing the generation of the representative sub-signature of the particular cluster, wherein the optimizing comprises considering sub-signatures that are likely to be effective representative sub-signatures of the particular cluster.

17. The system of claim 13, wherein the at least one processor is further configured for optimizing generation of the representative sub-signature of the particular cluster, wherein the optimizing comprises eliminating from consideration at least one of:
    one or more sub-signatures that are unlikely to be an effective representative sub-signature of the particular cluster;
    one or more sub-signatures by using the first factor;
    one or more sub-signatures that do not occur in at least a predetermined percentage of signatures of the particular cluster; and
    one or more sub-signatures that do not occur in at least fifty percent of the signatures of the particular cluster.

18. The system of claim 13, wherein the signature includes at least one of:
    a computer-readable format; and
    a computer-readable string of characters that comports with a coding standard.

19. The system of claim 13, wherein the item includes at least one of:
    a CD;
    a DVD;
    a Blu-ray Disc;
    an album;
    a song;
    a track; and
    a chapter.

20. The system of claim 13, wherein the signature includes at least one of:
    an audio fingerprint;
    an audio identifier;
    a video identifier;
    a disc identifier;
    a CD identifier;
    a DVD identifier;
    a Blu-ray Disc identifier;
    a media identifier;
    a high definition media identifier;
    a human fingerprint;
    a human footprint;

an animal fingerprint;
an animal footprint;
a handwritten signature;
an eye print;
a biometric identifier;
a retinal identifier;
a retinal scan;
a DNA identifier;
a DNA profile;
a genetic identifier; and
a genetic profile.

21. The system of claim 13, wherein the signature includes a computer-readable string of characters that comports with a coding standard, and wherein the coding standard includes at least one of:
alphabet;
alphanumeric;
decimal;
hexadecimal;
binary;
American Standard Code for Information Interchange;
Unicode; and
Universal Character Set.

22. The system of claim 13, wherein the signature includes an identifier that is initially not computer-readable, and wherein the at least one processor is further configured for converting the identifier into a computer-readable signature.

23. The system of claim 22, wherein the sub-signature comprises a subset of the computer-readable signature, and wherein the identifier that is initially not computer-readable includes at least one of:
a human fingerprint;
a human footprint;
an animal fingerprint;
an animal footprint;
a handwritten signature;
an eye print;
a biometric identifier;
a retinal identifier;
a retinal scan;
a DNA identifier;
a DNA profile;
a genetic identifier; and
a genetic profile.

24. The system of claim 13, wherein a cluster includes a set of alternative signatures that are likely to be identifiers of a same item.

25. A non-transitory computer readable storage medium retrievably storing one or more instructions for generating a representative sub-signature of a particular cluster of signatures, wherein the one or more instructions, when executed by one or more processors, cause the one or more processors to perform the steps of:
reading a sub-signature of a signature of the particular cluster, wherein the signature includes an identifier of an item;
calculating a first factor for the sub-signature, wherein the first factor is based on how many signatures in the particular cluster contain the sub-signature;
calculating a second factor for the sub-signature, wherein the second factor is based on how many signatures in other clusters contain the sub-signature; and
calculating an effectiveness score for the sub-signature, wherein the effectiveness score is based on at least the first factor and the second factor; and
determining one or more representative sub-signatures for the particular cluster, wherein the one or more sub-signatures are based on one or more effectiveness scores; and
at least one of:
reading one or more additional sub-signatures of a signature of the particular cluster;
calculating a first factor for each additional sub-signature;
calculating a second factor for each additional sub-signature; and
calculating an effectiveness score for each additional sub-signature,
wherein calculating the first factor comprises increasing the first factor as the number of signatures containing the sub-signature in the particular cluster increases,
wherein calculating the second factor comprises increasing the second factor as the number of signatures in other clusters containing the sub-signature increases, and
wherein calculating the effectiveness score comprises dividing the first factor by the second factor.

26. The method of claim 1, wherein the signature includes at least one of:
an audio fingerprint;
an audio identifier;
a video identifier;
a disc identifier;
a CD identifier;
a DVD identifier;
a Blu-ray Disc identifier;
a high definition media identifier;
a human fingerprint;
a human footprint;
an animal fingerprint;
an animal footprint;
a handwritten signature;
an eye print;
a biometric identifier;
a retinal identifier;
a retinal scan;
a DNA identifier;
a DNA profile;
a genetic identifier; and
a genetic profile.

27. The method of claim 1, wherein the effectiveness score is inversely proportional to the second factor.

28. The system of claim 13, wherein the effectiveness score is inversely proportional to the second factor.

29. The non-transitory computer readable storage medium of claim 25, wherein the effectiveness score is inversely proportional to the second factor.

* * * * *